US012263903B1

(12) United States Patent
Pfouts

(10) Patent No.: US 12,263,903 B1
(45) Date of Patent: Apr. 1, 2025

(54) UNIVERSAL TRAILER

(71) Applicant: Mark Pfouts, Venice, FL (US)

(72) Inventor: Mark Pfouts, Venice, FL (US)

(*) Notice: Subject to any disclaimer, the term of this patent is extended or adjusted under 35 U.S.C. 154(b) by 0 days.

(21) Appl. No.: 18/935,105

(22) Filed: Nov. 1, 2024

Related U.S. Application Data

(60) Provisional application No. 63/611,416, filed on Dec. 18, 2023.

(51) Int. Cl.
B62D 63/06 (2006.01)
B62D 25/06 (2006.01)
B62D 33/04 (2006.01)

(52) U.S. Cl.
CPC .......... B62D 63/062 (2013.01); B62D 25/06 (2013.01); B62D 33/046 (2013.01)

(58) Field of Classification Search
CPC ..... B62D 63/062; B62D 25/06; B62D 33/046
See application file for complete search history.

(56) References Cited

U.S. PATENT DOCUMENTS

| | | | | |
|---|---|---|---|---|
| 2,495,678 A * | 1/1950 | Bellinghausen | ....... | B62D 33/08 296/13 |
| 2,720,413 A * | 10/1955 | Halverson | ............... | B62B 1/208 296/10 |
| 3,612,600 A * | 10/1971 | Salichs | ................ | B62D 63/061 296/181.7 |
| 4,035,015 A * | 7/1977 | Smith | .................. | B62D 63/062 280/789 |
| 4,126,324 A * | 11/1978 | Browning | ............ | B62D 63/061 296/10 |
| 4,128,258 A * | 12/1978 | Johnson | ................. | B62D 21/14 280/46 |
| 5,480,180 A * | 1/1996 | Fuller | ................... | B62D 33/033 280/491.1 |
| 5,957,482 A * | 9/1999 | Shorter | .................... | B62B 3/007 280/47.35 |
| D418,451 S * | 1/2000 | Konecheck | .................. | D12/101 |
| 6,378,893 B1 * | 4/2002 | Jager | ..................... | B62D 33/033 280/401 |
| 6,669,269 B1 * | 12/2003 | Tran-Ngoc | ........... | B62D 63/061 296/159 |
| 6,962,370 B2 * | 11/2005 | Simpson | .............. | B62D 63/061 280/789 |

(Continued)

Primary Examiner — Jacob B Meyer
(74) Attorney, Agent, or Firm — Gulf Coast Property Management Group

(57) ABSTRACT

A universal trailer configured to be operated in a first mode, second mode, third mode and a fourth mode. The universal trailer includes a frame having support members, axles and wheels to facilitate towing thereof. A platform member is superposed the frame and is tiltably movable. In the first mode the platform member has no side panel members secured thereto. The present invention includes a plurality of side panel members that are operably couplable to form a first row and a second row. The present invention further includes a plurality of roof panel members that are operably coupled to the second row to provide enclosing of the trailer for its fourth mode of operation. The plurality of said panel members include connection members configured to secure the first row to the platform member. Upper connection members are configured to secure the second row to the first row.

20 Claims, 9 Drawing Sheets

(56) References Cited

U.S. PATENT DOCUMENTS

| | | | | |
|---|---|---|---|---|
| 7,052,033 | B2* | 5/2006 | McDonell | B62D 63/062 |
| | | | | 296/181.7 |
| 7,073,816 | B1* | 7/2006 | Larson | B62D 63/062 |
| | | | | 280/789 |
| 7,150,466 | B1* | 12/2006 | Chapman | B62D 63/061 |
| | | | | 280/37 |
| 7,651,117 | B1* | 1/2010 | McGee | B62D 63/062 |
| | | | | 280/639 |
| 7,708,299 | B2* | 5/2010 | Duval | B60P 1/435 |
| | | | | 280/789 |
| 8,448,978 | B2* | 5/2013 | Alvarino | B62D 63/067 |
| | | | | 280/638 |
| 8,590,962 | B2* | 11/2013 | Nye | B62D 33/027 |
| | | | | 296/183.1 |
| 9,192,867 | B1* | 11/2015 | Sann | A63B 1/00 |
| 9,365,246 | B1* | 6/2016 | Holt | B62B 1/204 |
| 9,394,017 | B2* | 7/2016 | Kennemer | B62D 33/033 |
| 9,403,567 | B2* | 8/2016 | Bermes | B62D 63/062 |
| 9,481,404 | B1* | 11/2016 | Rich | B62D 33/033 |
| 10,676,144 | B2* | 6/2020 | Barnes | B62D 63/064 |
| 11,358,658 | B2* | 6/2022 | Baker | B62D 24/00 |
| 11,453,448 | B1* | 9/2022 | Andrews | B60D 1/52 |
| 11,623,704 | B2* | 4/2023 | Taylor | B62D 63/062 |
| | | | | 280/656 |
| 11,920,363 | B2* | 3/2024 | Elhart | B62D 63/061 |
| 12,091,113 | B1* | 9/2024 | Scaroni | B62D 21/20 |
| 2007/0031226 | A1* | 2/2007 | Hynes | B60P 1/43 |
| | | | | 414/482 |
| 2014/0265248 | A1* | 9/2014 | Ravencroft | B62D 63/061 |
| | | | | 280/491.1 |
| 2023/0347990 | A1* | 11/2023 | Sharkar | B60P 1/26 |
| 2024/0246624 | A1* | 7/2024 | Squires | B62D 63/08 |

\* cited by examiner

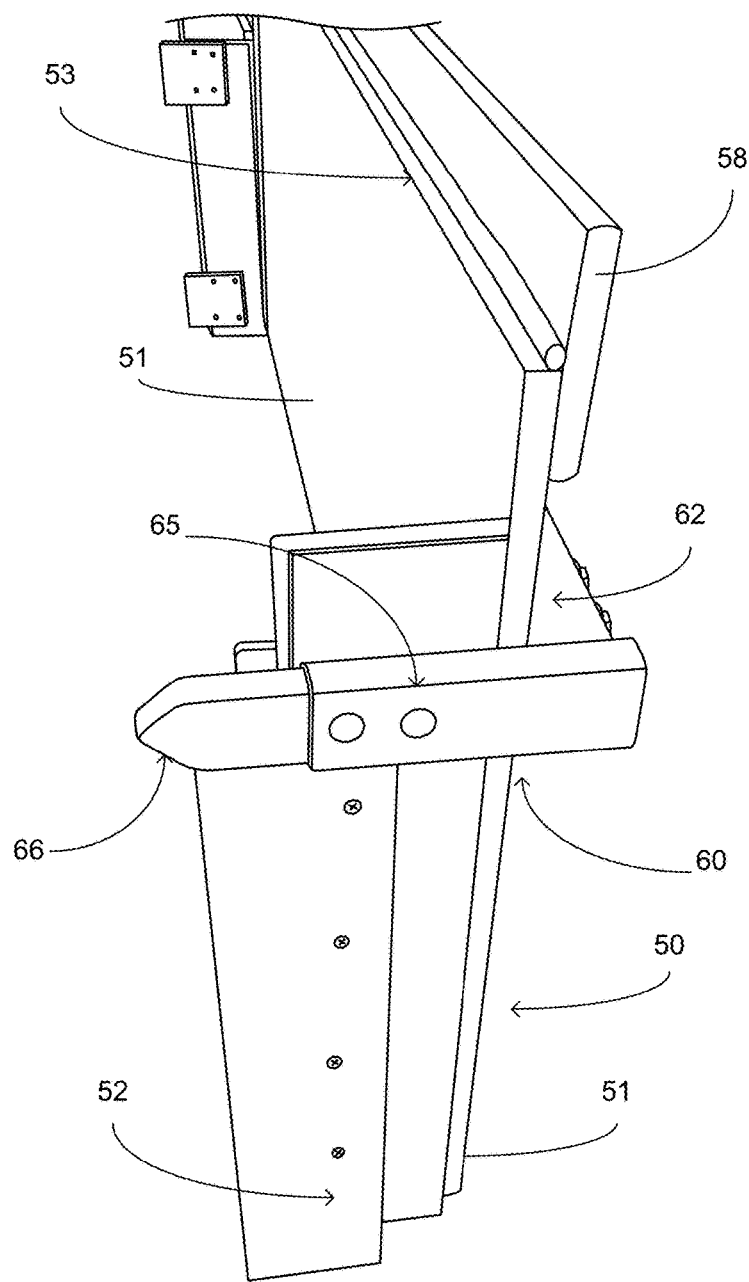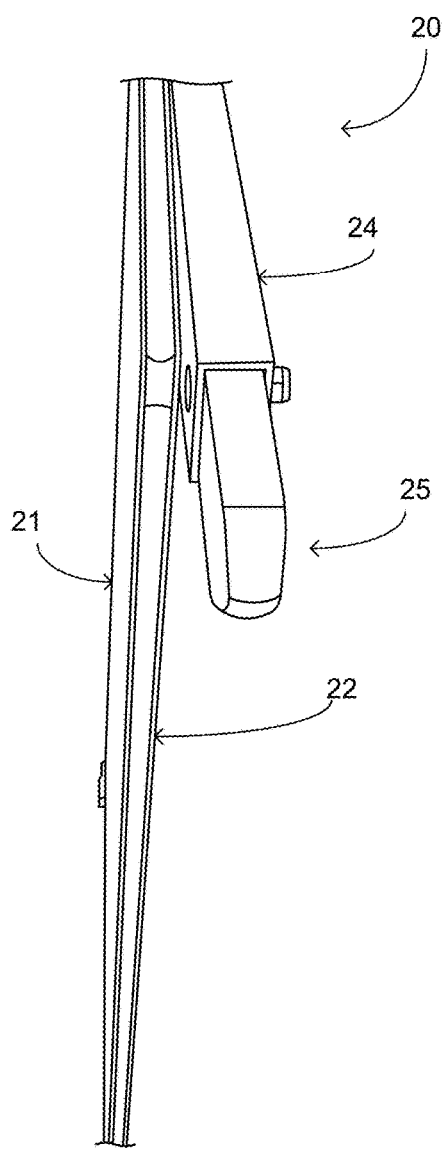
FIG. 2
FIG. 3

UNIVERSAL TRAILER

PRIORITY UNDER 35 U.S.C SECTION 119 (e) & 37 C.F.R. SECTION 1.78

This nonprovisional application claims priority based upon the following prior United States Provisional Patent Application entitled: Universal Trailer Application No. 63/611,416 filed Dec. 18, 2023, in the name of Mark Pfouts, which is hereby incorporated by reference for all purposes.

FIELD OF THE INVENTION

The present invention relates generally to towable trailers, more specifically but not by way of limitation, a towable trailer that is operable to be configured for a plurality of different uses and includes various permanent and non-permanent elements to facilitate the different configurations of the universal trailer of the present invention

BACKGROUND

Millions of trailers traverse the roads everyday carrying various types of cargo to their destination. There are different types of trailers that are utilized to transport the alternate types of cargo. Palletized loads, boxes and similar types of cargo are most often carried in conventional box trailers that are completely enclosed. Another type of frequently utilized trailer is a flatbed trailer. These types of trailers are utilized for materials that cannot be palletized such as but not limited to lumber and pipe. The flatbed trailer is configured to receive the load superposed on the upper surface and the load is subsequently secured thereto One issue with conventional trailers is that these trailers are built typically for a singular purpose. By way of example but not limitation, cargo trailers are built to receive and haul various types of cargo, boat trailers are designed with bunks to receive and haul a boat and recreational vehicle trailers are constructed so as to provide a singular function. While these conventional trailers are capable of executing the task for which they are built, these conventional trailers are not adaptable to be utilized for alternate purposes.

It is intended within the scope of the present invention to provide a universal trailer that is operable to be configured in numerous alternate embodiments employing a single frame wherein the embodiments provide different functionalities.

SUMMARY OF THE INVENTION

It is the object of the present invention to provide a universal trailer that is configurable into multiple embodiments so as to provide alternate functionalities wherein the trailer of the present invention includes a frame wherein the frame further has axle and wheel members.

Another object of the present invention is to provide a trailer that is constructed to be transitioned between a plurality of embodiments wherein the frame of the present invention can be provided in alternate lengths, heights and widths.

A further object of the present invention is to provide a universal trailer that is configurable into multiple embodiments so as to provide alternate functionalities wherein the frame can be configured with a frame hitch tongue or as a gooseneck or fifth wheel.

Still another object of the present invention is to provide a trailer that is constructed to be transitioned between a plurality of embodiments wherein the frame has operably coupled thereto a support platform wherein the support platform is configured to be tiltable.

An additional object of the present invention is to provide a universal trailer that is configurable into multiple embodiments so as to provide alternate functionalities wherein the support platform has operably coupled to the front end thereof a hoist member.

Another object of the present invention is to provide a universal trailer that is configurable into multiple embodiments so as to provide alternate functionalities wherein a mode of the present invention includes a container member superposed to the support platform.

Still a further object of the present invention is to provide a universal trailer that is configurable into multiple embodiments so as to provide alternate functionalities wherein the container member has a top member releasably secured thereto.

Still a further object of the present invention is to provide a trailer that is constructed to be transitioned between a plurality of embodiments wherein an embodiment of the present invention wherein the top member is provided in panels releasably secured to the upper row of side panel members.

An additional object of the present invention is to provide a universal trailer that is configurable into multiple embodiments so as to provide alternate functionalities wherein an embodiment of the present invention can include outrigger members.

Another object of the present invention is to provide a trailer that is constructed to be transitioned between a plurality of embodiments wherein the support platform can include an extendible ramp member.

Still an additional object of the present invention is to provide a trailer that is constructed to be transitioned between a plurality of embodiments wherein the present invention can be manufactured from suitable metals such as but not limited to aluminum.

Another object of the present invention is to provide a universal trailer that is configurable into multiple embodiments so as to provide alternate functionalities wherein the hoist member can incorporate elements such as but not limited to gas springs, cables and winch motors.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 2 is a detailed view of a roof panel member; and FIG. 3 is a detailed end view of a connection member.

DETAILED DESCRIPTION

Figure 1:
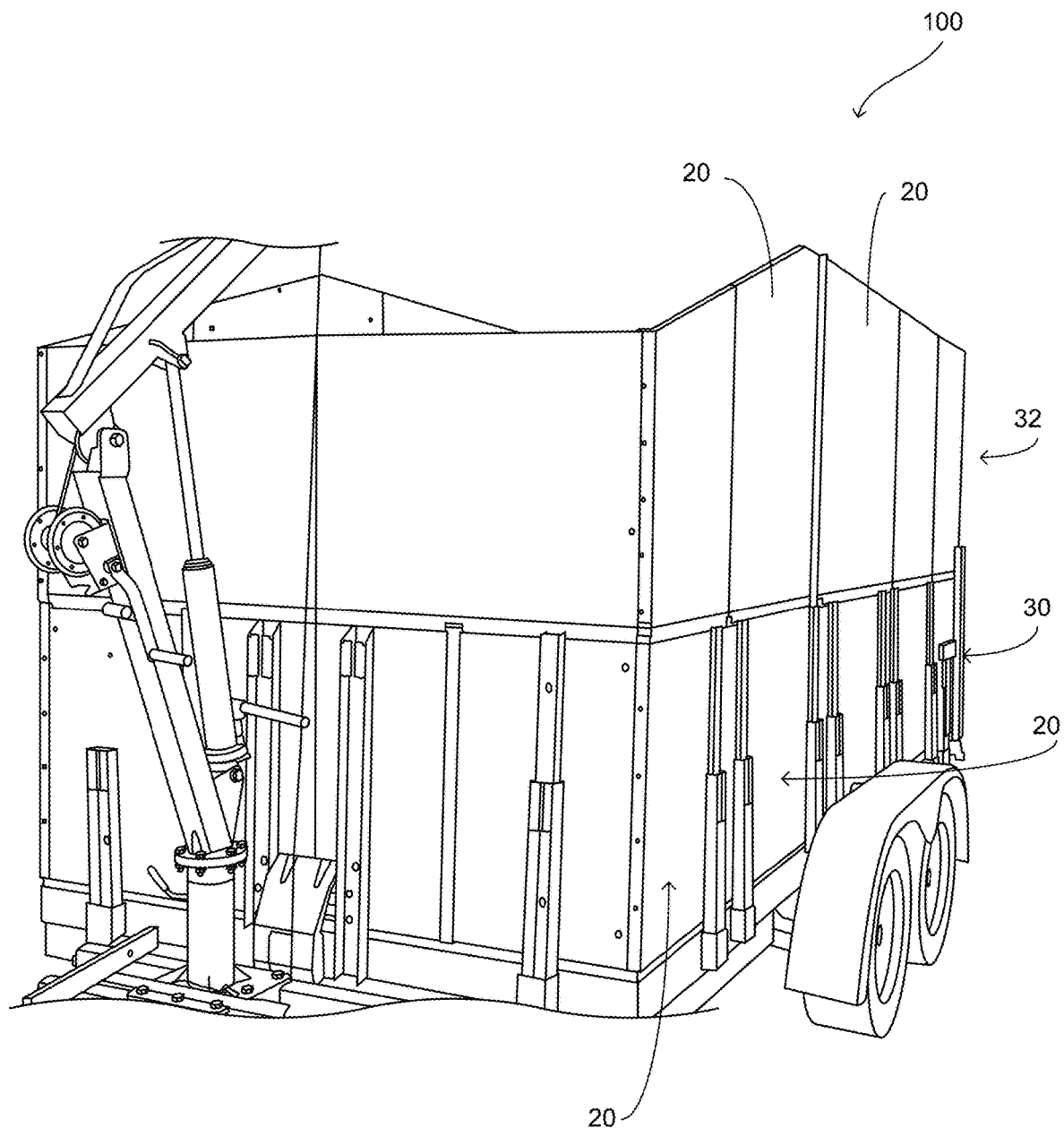
FIG. 1 is a front perspective view of the trailer of the present invention in a second mode.

Referring now to the drawings submitted herewith, wherein various elements depicted therein are not necessarily drawn to scale and wherein through the views and figures like elements are referenced with identical reference numerals, there is illustrated a universal trailer 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the universal trailer 100 is illustrated herein in a preferred embodiment but it should be understood within the scope of the present invention that the variations are contemplated within the scope of the present invention. By way of example but not limitation, it should be understood that the universal trailer 100 could have a single axle or more than the two axles illustrated herein. Additionally, it should be understood within the scope of the present invention that the universal trailer 100 could be provided in various sizes wherein the width and height thereof are different.

Figure 9:
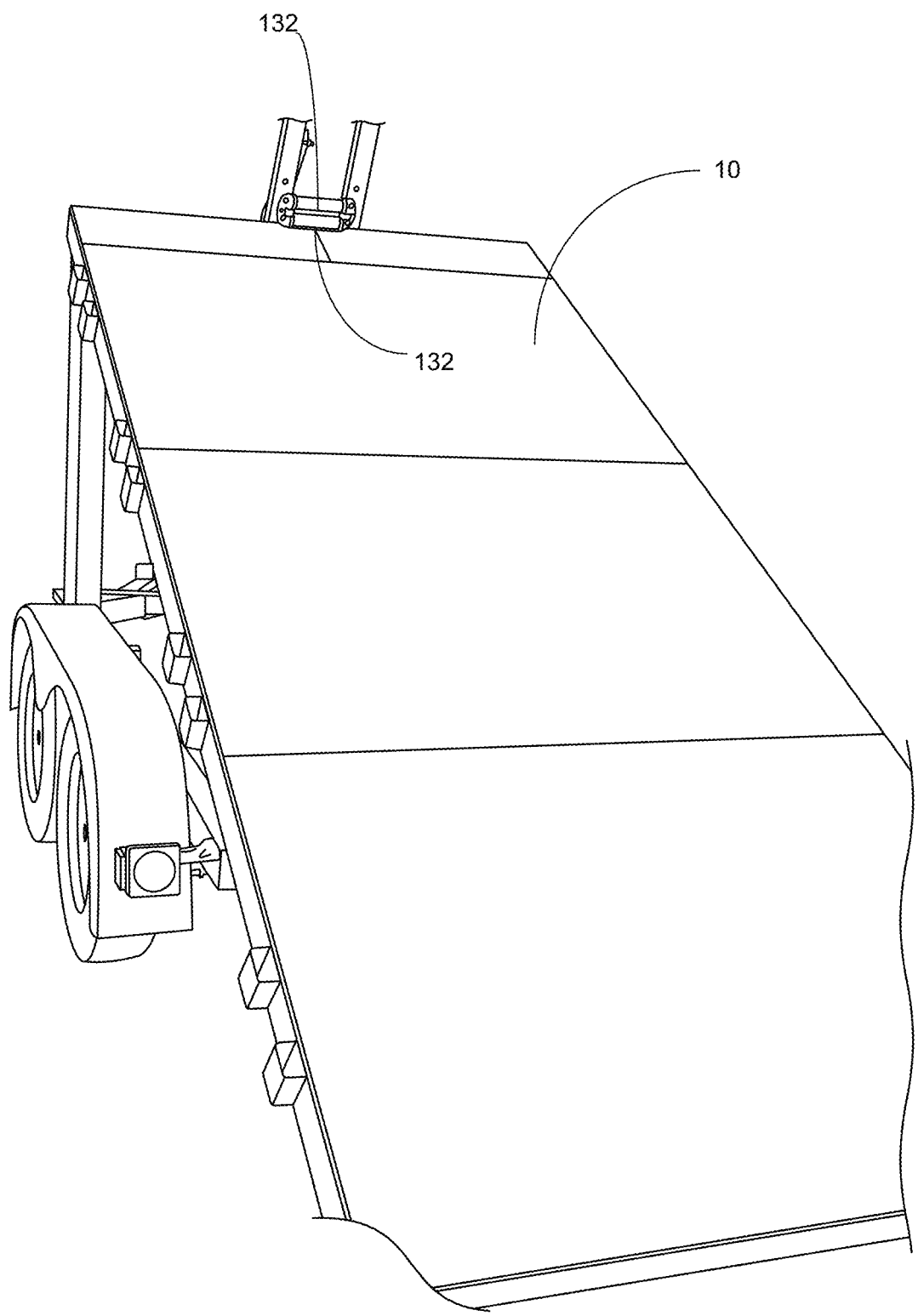
FIG. 9 is a rear view of the platform member in a tilted position.
Figure 10:
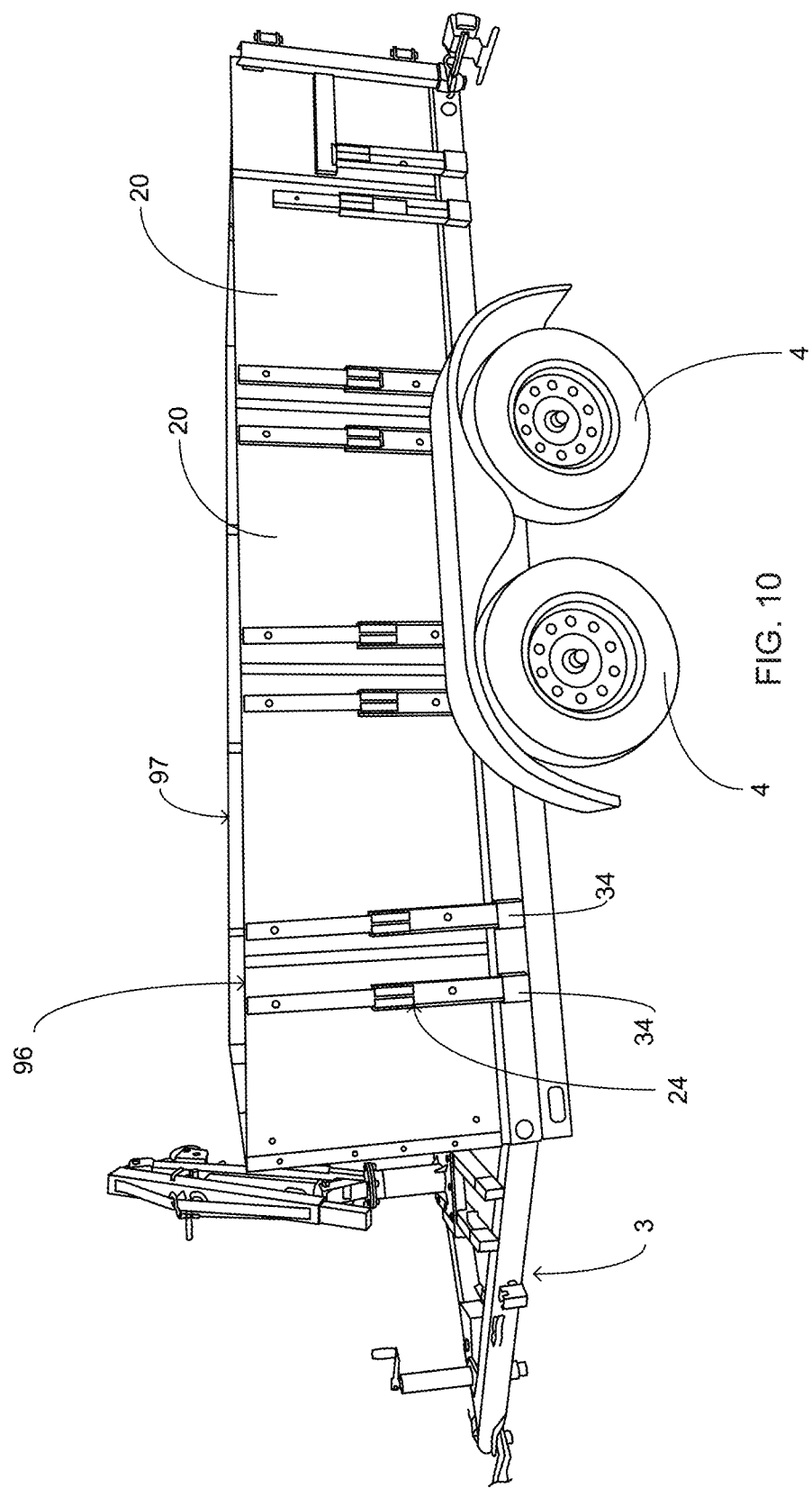
FIG. 10 is a side view of the trailer of the present invention with the first row of side panel members installed.
Figure 11:
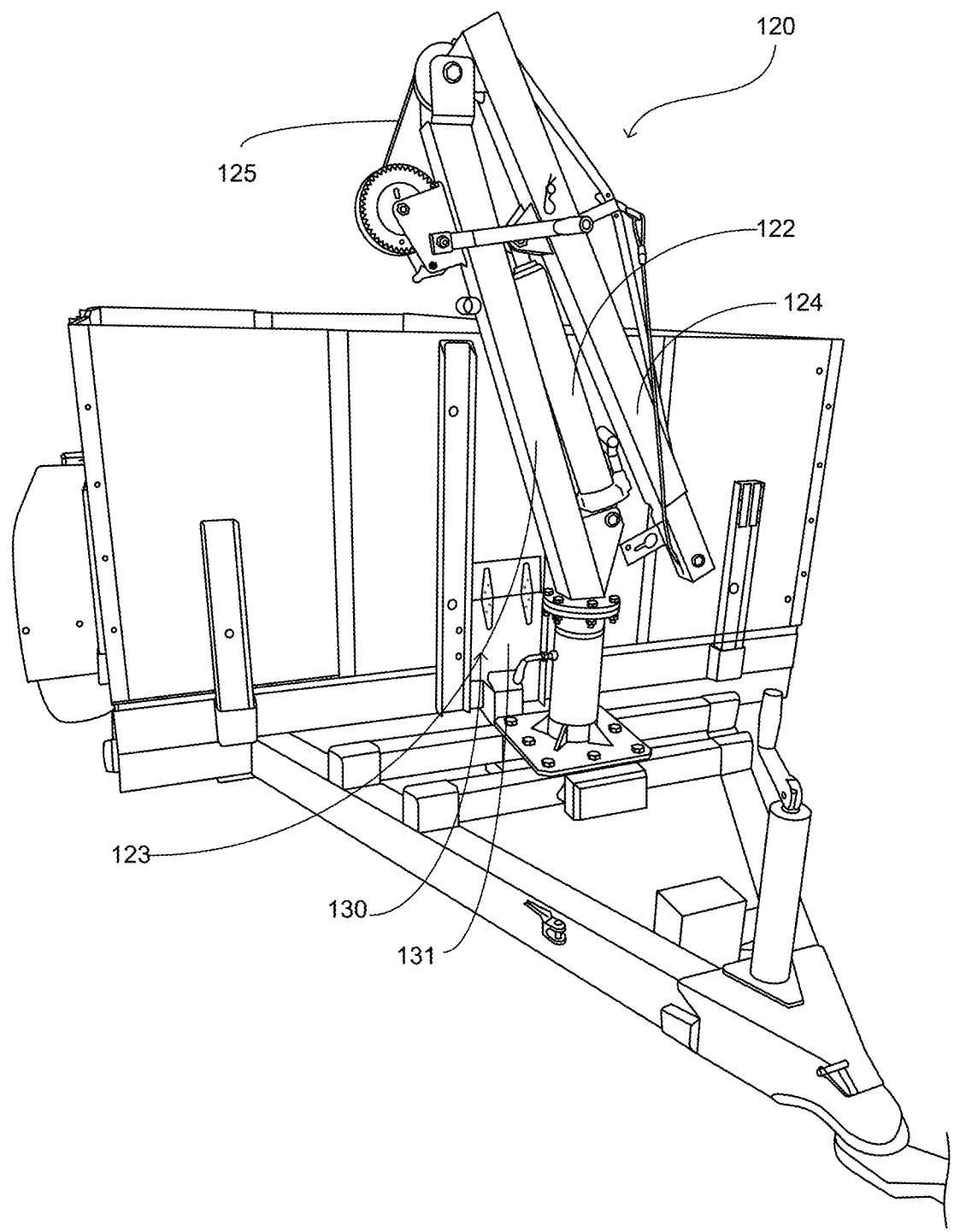
FIG. 11 is a front view of the present invention with hoist member in a stored position.

The universal trailer 100 includes a frame 5 wherein the frame 5 is a conventional trailer frame having the necessary support members to handle the load capacity desired for the universal trailer 100. Conventional wheel members 4, tongue section 3 are present and are manufactured in compliance with roadway safety requirements. Superposed to the frame 5 is a platform member 10. The platform member 10 is planar in manner and is movable from a first position to a second position. The second position of the platform member 10 is illustrated herein in FIG. 9 wherein the platform member 10 is placed in a tilted position. The second position facilitates either loading of an object or can provide removal of items superposed thereon. In the first position the platform member 10 is level in orientation, as is illustrated herein in FIG. 10.

Releasably secured to the platform member 10 are side panel members 20. The side panel members 20 are assembled to provide a first row 30 and second row 32 wherein the second row 32 is superposed and releasably coupled to the first row 30. The side panel members 20 are employed to place the universal trailer 100 in a second mode and a third mode. In its first mode, the universal trailer 100 does not have the first row 30 and second row 32 of the side panel members 20 installed, as is illustrated herein in FIG. 9. This allows a user of the universal trailer 100 to utilize the universal trailer 100 for an intended application. In the second mode, the first row 30 of the side panel members 20 are releasably coupled to the perimeter of the platform member 10 as is further described herein. The side panel members 20 are similarly constructed for both the first row 30 and second row 32. It should be understood within the scope of the present invention that the side panel members 20 could vary in width and height depending upon the location in which the side panel member 20 will be secured.

The side panel members 20 utilized for the first row 30 have a first side 21 and second side 22 being planar in manner. Secured to the second side 22 are connection members 24. Connection members 24 are operably coupled to the second side of the side panel members 20 utilizing suitable techniques. The connection members 24 are rectangular in shape being manufactured from a suitable rigid material. The connection members 24 further include a first end 25 and a second end 26. First end 25 is tapered in shaped and is configured to be operably inserted into the receiving members 34 disposed on the perimeter edge 9 of the platform member 10. Insertion of the connection members 24 operably coupled to the second side 22 of the side panel members 20 provides a releasably operable coupling of the side panel member 20 around the perimeter edge 9 of the platform member 10. In the first mode, as illustrated herein in FIG. 10, the universal trailer 100, has the first row 30 of side panel members 20 releasably coupled to the receiving members 34 around the perimeter edge 9 of the platform member 10. This provides an upper edge 97 of a first height that allows a user to fill the void 96 with objects desired to be hauled with the universal trailer 100.

The second end 26 of the connection member 24 includes opening 27 that is formed from wall members 28, wherein the wall members 28 are integrally formed utilizing suitable techniques. As is further discussed herein, the opening 27 is operable to have a second end 45 of an upper connection member 44 that is secured to a second side 22 of a side panel member 20 employed for the second row 32 of side panel members 20 wherein the second row 32 is superposed and releasably secured to the first row 30. It should be understood within the scope of the present invention that the side panel members 20 utilized to comprise the first row 30 could be provided in alternate sizes based on the length of the platform member 10. Furthermore, it is contemplated within the scope of the present invention that the side panel members 20 utilized to form the first row 30 could have as few as one connection member 24 secured to the second side 22 thereof or more than one connection member 24. While a particular structure for the connection member 24 has been illustrated and discussed herein, it is contemplated within the scope of the present invention that alternate mateable structures for the connection members 24 could be employed to facilitate the mateable and releasable coupling side panel members 20 to the receiving members 34 in place of and/or in conjunction with the connection members 24 as described herein.

In the third mode of the universal trailer 100, a second row 32 of side panel members 20 are operably installed. The side panel members 20 for the second row 32 include upper connection members 44. Upper connection members 44 are secured to the side panel members 20 utilized for the second row 32 employing suitable mechanical techniques. The upper connection members 44 include first end 45 and second end 46. The first end 45 is similarly shaped as first end 25, previously described herein, and is insertable into the opening 25 so as to releasably secured the side panel member 20 being employed to construct the second row 32 to the first row 30 of side panel members 20. The second end 46 of the upper connection members 44 includes an opening 47 wherein as is further discussed herein is configured to mateably coupled with a roof panel connection member 60. It is contemplated within the scope of the present invention that the side panel members 20 utilized to construct the second row 32 could have secured thereto one upper connection member 44 or more than one upper connection member 44. Furthermore, it should be understood within the scope of the present invention that the edges 19 of the side panel members 20 are constructed to facilitate a mateable coupling with edges 19 of the adjoining side panel member 20. By way of example but not limitation, a tongue and groove construction could be utilized for the edges 19 of the side panel members 20. Additionally, it should be understood within the scope of the present invention that all connections between side panel members 20 are weatherproof and could utilize elements such as but not limited to rubber seals to ensure a weatherproof connection between the side panel members 20. The second row 32 of side panel members 20 provides an upper edge 96 that is greater than that of upper edge 97 of the first row 30. This allows a user of the universal trailer 100 to place objects within the universal trailer 100 at a greater height than with only the first row 30 installed.

The universal trailer 100 includes a plurality of roof panel members 50 that are configured to extend across the second row 32 of side panel members 20 in order to provide a fourth mode of operation for the universal trailer 100. In the fourth mode, the universal trailer 100 is fully enclosed as the roof panel members 50 provide creation of an interior volume 95 wherein the interior volume 95 is completely enclosed and weatherproof. The roof panel member 50 is comprised of a planar support member 51 wherein the planar support member 51 extends across the full width of the universal trailer 100. Operably coupled to the lateral edges 51 of the planar support member 50 are vertical support members 52. Vertical support members 52 are secured to the planar support member 51 being perpendicular thereto extending downward therefrom. The vertical support members 52 provide structural support for the roof panel connection member 60. The roof panel member 50 is configured to be releasably superposed the side panel members 20 comprising the second row 32. The roof panel connection member 60 includes first portion 62 and second portion 65 wherein the first portion 62 and second portion 65 are perpendicularly secured. The first portion 62 is superposed the upper surface of the roof panel member 50 being secured thereto utilizing suitable mechanical elements. It should be understood within the scope of the present invention that the first portion 62 could extend across the complete width of the roof panel member 50 or only partially thereacross.

The second portion 65 of the roof panel connection member 60 extends downward from the roof panel member 50 being adjacent to and connected to the vertical support members 52. The second portion 65 is configured to operably couple with the upper connection members 44 so as to releasably secure the roof panel member 50 over the top of the second row 32 of side panel members 20. End 66 of the second portion 65 is journaled into an opening 47 at second end 46. End 66 is tapered in form facilitating insertion into opening 47. A lap connection member 58 is secured to the roof panel member 50 proximate a first end 53 thereof. The lap connection member 58 is superposed the first end 53 extending therebeyond so as to overlap an adjacent roof panel member 50. It should be understood that the roof panel member 50 could have a lap connection member 58 at either a single end or both ends depending upon the location of the roof panel member 50 during assembly and installation of the plurality of roof panel members 50. It is contemplated within the scope of the present invention that the roof panel members 50 could be provided in alternate depths and further could include either a single roof panel connection member 60 or more than one roof panel connection member 60.

Figure 4:
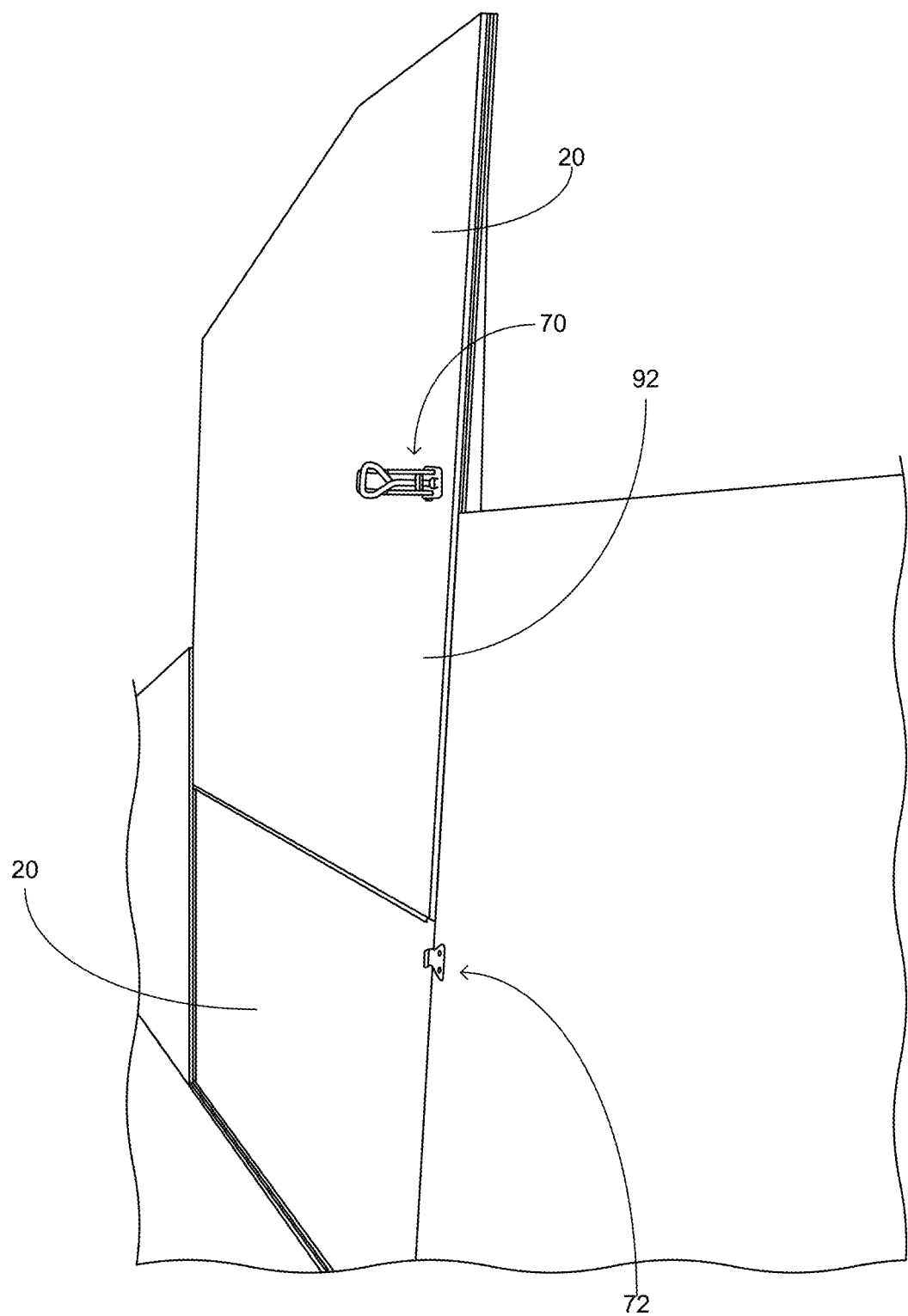
FIG. 4 is a detailed view of the interior surface of the side panel members.
Figure 5:
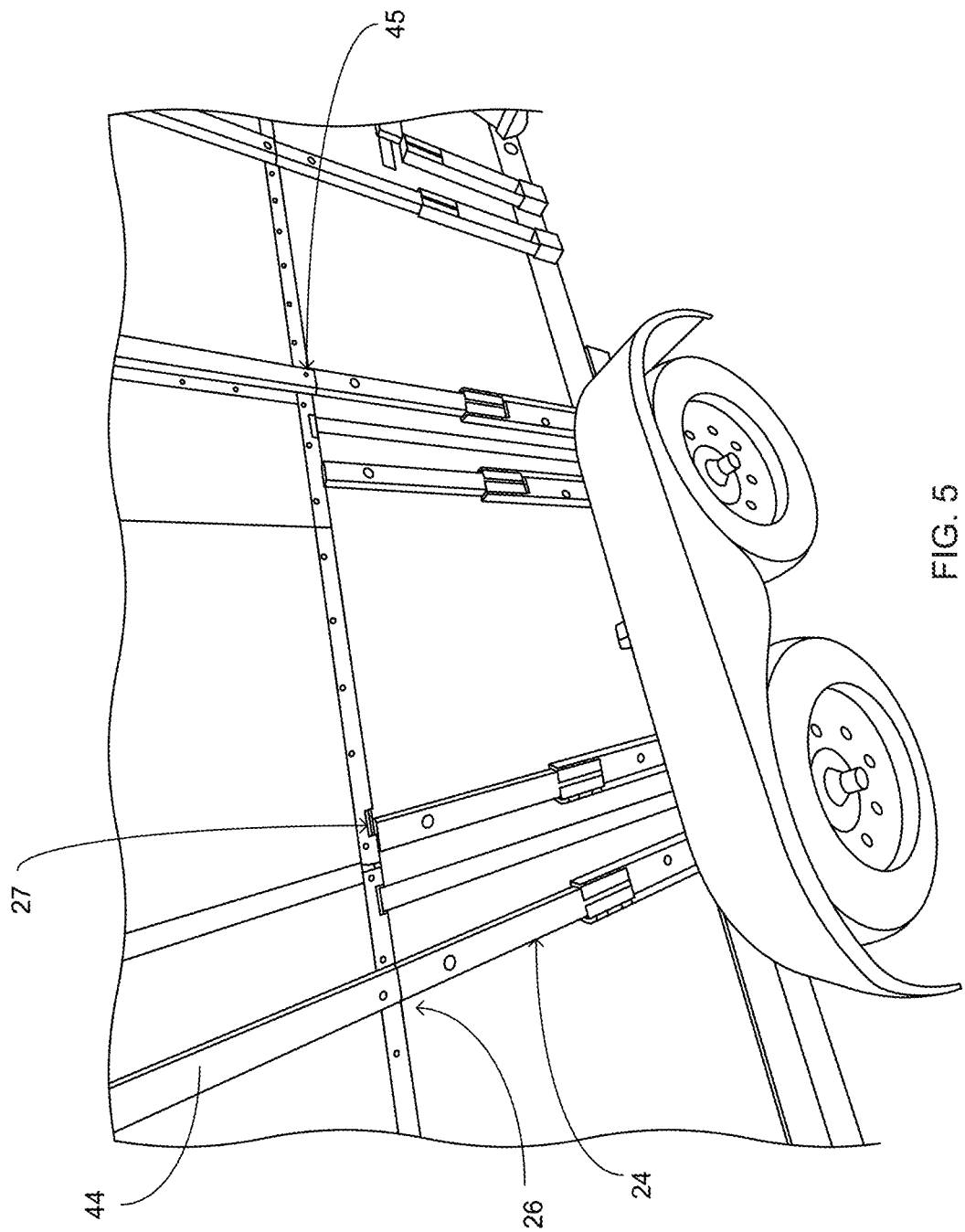
FIG. 5 is a detailed view of the exterior surface of the side panel members.
Figure 6:
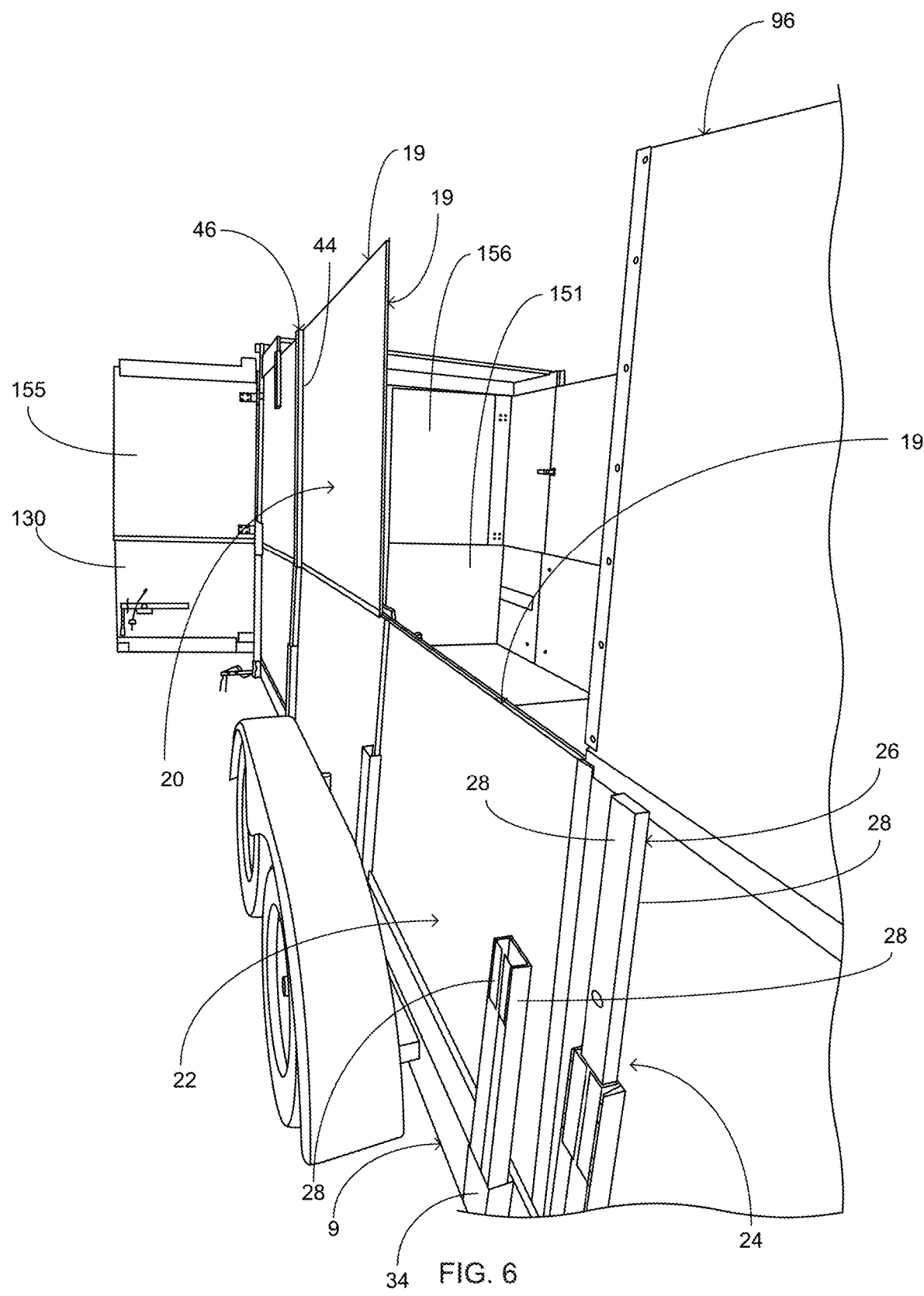
FIG. 6 is a rear side view of the trailer of the present invention having a panel member removed from the second row.
Figure 8:
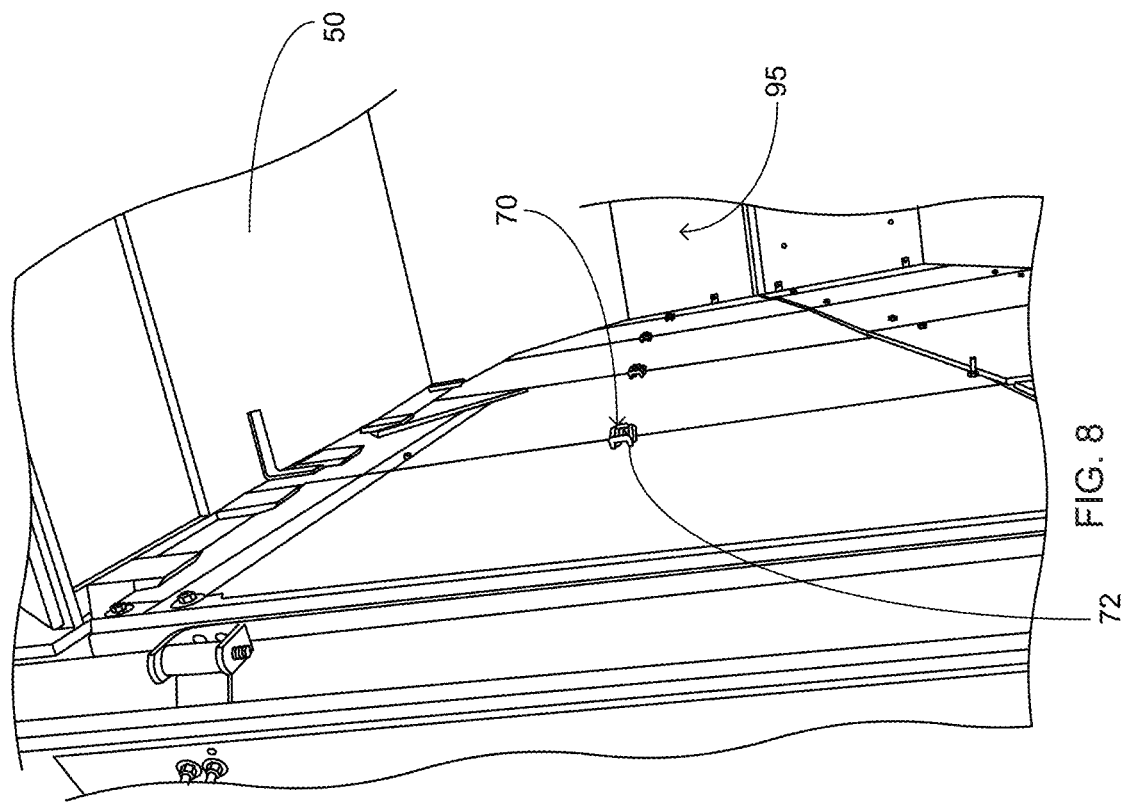
FIG. 8 is an end view of the interior of the trailer of the present invention with the first row and second row of side panel members installed.
Figure 7:
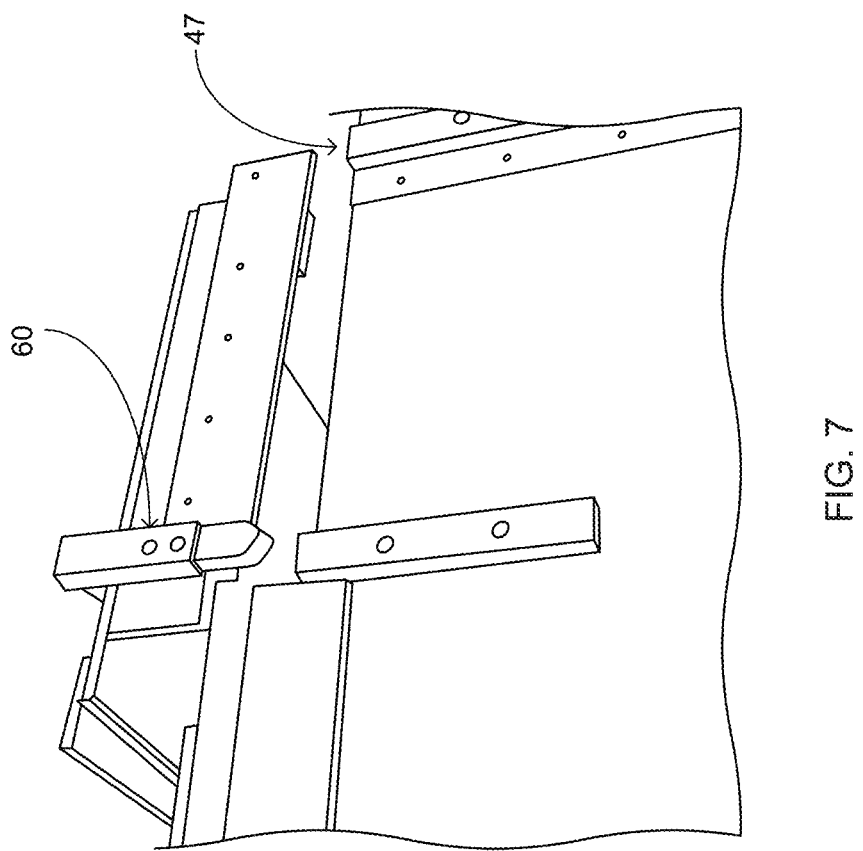
FIG. 7 is a detailed view of a roof panel member.

Referring in particular to FIG. 4 submitted as a part hereof, the universal trailer 100 includes a plurality of first fasteners 70 and second fasteners 72 secured to the first side 21 of the side panel members 20. The first fasteners 70 and second fasteners 72 are located on adjacent side panel members 20 opposite adjoining seams 92. The first fasteners 70 and second fasteners 72 are configured to ensure and maintain the releasably securing of the side panel members 20 applying a force inwards therebetween. The force assists in maintenance of the structural integrity of the assembled side panel members 20 and further ensures a weather tight seal therebetween. The first fastener 70 is configured to operably couple with the second fastener 72 located on the opposing side of the seam 92 and apply a force maintaining the second fastener 72 biased towards the first fastener 70. It should be understood within the scope of the present invention that the various alternate quantities of the first fasteners 70 and second fasteners 72 could be employed along seams 92 to facilitate the securing of the side panel members 20. Additionally, it is contemplated within the scope of the present invention that the first fastener 70 and second fastener 72 could be constructed in various alternate manners to achieve the desired objective discussed herein.

Operably coupled to the tongue section 3 of the universal trailer 100 is a hoist-winch member 120. The hoist-winch member 120 is secured to the tongue section 3 utilizing suitable support and mechanical elements. The hoist-winch member 120 is operable to lift objects and place into the interior volume 95 or onto the platform member 10. The hoist-winch member 120 employs hydraulic member 122 to manipulate movement of arm members 123 and 124 wherein arm members 123,124 are articulated in a direction to achieve the desired objective. The hoist-winch member 120 further includes a cable 125 that is routed through opening 130 and roller members 132 so as to be disposed within the interior volume 95. The cable 125 can be equipped with elements on the distal end thereof to facilitate loading of large objects onto the platform member 10. Opening 130 includes a hingedly secured door member 131 that is moved to an open position to permit the distal end of the cable 125 to be journaled therethrough. Roller members 132 are movably mounted and positioned so as to maintain the cable 125 adjacent the upper surface of the platform member 10.

While not particularly illustrated herein, additional elements for the universal trailer 100 are contemplated within the scope of the present invention. By way of example but not limitation, it is contemplated within the scope of the present invention that the universal trailer 100 could have operably secured thereto ramp members wherein the ramp members are slidably mounted underneath the platform member 10. Ramp members are slidably mounted underneath the platform member 10 proximate the rear end thereof and are operable to extend outward for loading objects such as but not limited to a vehicle. Additionally, it is contemplated within the scope of the present invention that the universal trailer 100 could employ outrigger stability members on one or both sides of the trailer. As with conventional outrigger members, the outrigger members of the present invention would be telescopic in construction and extend laterally away from the universal trailer 100. In their extended position, the outrigger members would provide additional lateral support for loading heavy objects with the hoist-winch member 120. It should additionally be understood within the scope of the present invention that the universal trailer 100 could be operably coupled to a tow vehicle employing a fifth wheel style hitch or a frame receiver style hitch.

Hingedly secured to the first row 30 are rear door panel members 150,151. In the second mode of the universal trailer 100, the rear door panel members 150,151 can be hingedly coupled to the adjacent side panel members 20 in order to provide closing of the rear entry onto the platform member 20. In the third mode of the universal trailer 100, the upper rear door panel members 155,156 are hingedly secured to the second row 32 of the side panel members 20 so as to provide closure of the rear entry when the universal trailer 100 is in its third mode. It should be understood within the scope of the present invention that the rear door panel members 150,151 and the upper rear door panel members 155,156 could be hingedly secured utilizing various styles of hinge fasteners.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the claims.

What is claimed is:

1. A universal trailer configurable to operate in a plurality of modes wherein the universal trailer comprises:
   a frame, said frame having a plurality of support members integrally formed, said frame having at least one axle having wheels on opposing ends thereof;
   a platform member, said platform member being superposed said frame and operably coupled thereto, said platform member being movable between a first position and a second position, said platform member having a perimeter edge, said platform member being level in orientation in its first position, said platform member further having a plurality of receiving members operably coupled thereto proximate the perimeter edge thereof;
   a plurality of side panel members, said plurality of side panel members being manufactured from a rigid material, said plurality of side panel members having a first side and a second side, said plurality of side panel members having outer edges wherein the outer edges are mateable with outer edges of adjacent side panel members, said plurality of side panel members being configurable in a first row and a second row, wherein the universal trailer is in a second mode with the first row of side panel members installed, wherein said first row of side panel members are operably coupled to the platform member proximate the perimeter edge thereof;
   a plurality of connection members, said plurality of connection members being secured to said second side of said plurality of side panel members comprising said first row, said plurality of connection members being elongated and rectangular in form, said plurality of connection members having a first end and a second end, said first end of said plurality of connection members being tapered in shape, said second end of said plurality of connection members having an opening, said first end of said plurality of connection members being operably inserted into said plurality of receiving members located along said perimeter edge of said platform member, said plurality of connection members operable to facilitate installation of said first row of said plurality of side panel members, said first row of said plurality of side panel members having an upper edge defining a height of said first row of said side panel members; and
   wherein in said first mode, said platform member being open along said perimeter edge thereof.

2. The universal trailer configurable to operate in a plurality of modes as recited in claim 1, wherein the second row of side panel members have a first side and a second side, said second row of side panel members being operably coupled and superposed said first row of side panel members, said second row of said side panel members having an upper edge defining a height of said second row of said side panel members, said second row of side panels extending around the perimeter edge of said platform member.

3. The universal trailer configurable to operate in a plurality of modes as recited in claim 2, and further including a plurality of upper connection members, said plurality of upper connection members being secured to said second side of said side panel members comprising said second row, said plurality of upper connection members having a first end and a second end, said first end of said upper connection members being tapered in shape and configured to be inserted into said opening at said second end of said plurality of connection members, said second end of said plurality of upper connection members having an opening.

4. The universal trailer configurable to operate in a plurality of modes as recited in claim 3, wherein in said third mode said plurality of side panel members comprising said second row of side panel members are operably coupled to said first row of said side panel members.

5. The universal trailer configurable to operate in a plurality of modes as recited in claim 4, wherein the height of said upper edge of said second row of said side panel members has a height greater than that of the height of the first row of said side panel members.

6. The universal trailer configurable to operate in a plurality of modes as recited in claim 5, and further including a plurality of roof panel members, said plurality of roof panel members configured to releasably secured over said second row of side panel members, said plurality of roof panel members being planar in manner, said plurality of roof panel members having opposing lateral edges, said plurality of roof panel members having vertical support members secured thereto proximate said opposing edges, said vertical support members being perpendicular to and extending downward therefrom said plurality of roof panel members.

7. The universal trailer configurable to operate in a plurality of modes as recited in claim 6, wherein in said fourth mode said plurality of said roof panel members are operably installed onto said second row of said side panel members.

8. The universal trailer configurable to operate in a plurality of modes as recited in claim 7, and further including a plurality of roof panel connection members, said roof panel connection members being operably coupled to said plurality of roof panel members, said plurality of roof panel connection members having a first portion and a second portion, said first portion and said second portion of said plurality of roof panel connection members being perpendicular, said first portion of said plurality of roof panel connection members extending across said plurality of roof panel members intermediate said opposing lateral edges, said second portion of said plurality of roof connection members extending downward from said first portion of said plurality of roof panel connection members adjacent said vertical support members.

9. The universal trailer configurable to operate in a plurality of modes as recited in claim 8, wherein said second portion of said plurality of said roof panel connection members includes an end configured to be operably coupled with said opening at said second end of said upper connection members.

10. The universal trailer configurable to operate in a plurality of modes as recited in claim 9, and further including at least one lap connection member, said at least one lap connection member being superposed said plurality of roof panel members along a longitudinal edge thereof, said at least one lap connection member having a section that extends beyond said longitudinal edge.

11. The universal trailer configurable to operate in a plurality of modes as recited in claim 10, and further including a hoist-winch member, said hoist winch member being installed on a tongue section of the universal trailer, said hoist-winch member having arm members wherein the arm members are manipulated to assist in loading an object operably coupled thereto onto said platform member.

12. The universal trailer configurable to operate in a plurality of modes as recited in claim 11, wherein a front of the universal trailer formed by said first row of said side panel members further includes a hinged door over an opening, said opening configured to have a cable journaled therethrough when said hinged door is in an open position.

13. The universal trailer configurable to operate in a plurality of modes as recited in claim 12, that further includes a pair of roller members, said roller members being installed adjacent said hinged door, said roller members having a void therebetween to accommodate said cable therethrough.

14. The universal trailer configurable to operate in a plurality of modes as recited in claim 13, and further including a first fastener and a second fastener, said first fastener and said second fastener being secured to said first side of said plurality of side panel members, said first fastener being operably couplable to said second fastener, said first fastener and said second fastener being located on opposing sides of a seam present between adjoining side panel members.

15. A universal trailer configurable to operate in a plurality of modes wherein the universal trailer comprises:
a frame, said frame having a plurality of support members integrally formed, said frame having at least one axle having wheels on opposing ends thereof;
a platform member, said platform member being superposed said frame and operably coupled thereto, said platform member being movable between a first position and a second position, said platform member having a perimeter edge, said platform member being level in orientation in its first position, said platform member further having a plurality of receiving members operably coupled thereto proximate the perimeter edge thereof;
a plurality of side panel members, said plurality of side panel members being manufactured from a rigid material, said plurality of side panel members having a first side and a second side, said plurality of side panel members having outer edges wherein the outer edges are mateable with outer edges of adjacent side panel members, said plurality of side panel members being configurable in a first row and a second row, wherein the universal trailer is in a second mode with the first row of side panel members installed, wherein said first row of side panel members are operably coupled to the platform member proximate the perimeter edge thereof, wherein the second row of side panel members have a first side and a second side, said second row of side panel members being operably coupled and superposed said first row of side panel members, said second row of said side panel members having an upper edge defining a height of said second row of said side panel members, said second row of side panels extending around the perimeter edge of said platform member;
a plurality of connection members, said plurality of connection members being secured to said second side of said plurality of side panel members comprising said first row, said plurality of connection members being elongated and rectangular in form, said plurality of connection members having a first end and a second end, said first end of said plurality of connection members being tapered in shape, said second end of said plurality of connection members having an opening, said first end of said plurality of connection members being operably inserted into said plurality of receiving members located along said perimeter edge of said platform member, said plurality of connection members operable to facilitate installation of said first row of said plurality of side panel members, said first row of said plurality of side panel members having an upper edge defining a height of said first row of said side panel members;

a plurality of upper connection members, said plurality of upper connection members being secured to said second side of said side panel members comprising said second row, said plurality of upper connection members having a first end and a second end, said first end of said upper connection members being tapered in shape and configured to be inserted into said opening at said second end of said plurality of connection members, said second end of said plurality of upper connection members having an opening;

a plurality of roof panel members, said plurality of roof panel members configured to releasably secured over said second row of side panel members, said plurality of roof panel members being planar in manner, said plurality of roof panel members having opposing lateral edges, said plurality of roof panel members having vertical support members secured thereto proximate said opposing edges, said vertical support members being perpendicular to and extending downward therefrom said plurality of roof panel members;

a plurality of roof panel connection members, said roof panel connection members being operably coupled to said plurality of roof panel members, said plurality of roof panel connection members having a first portion and a second portion, said first portion and said second portion of said plurality of roof panel connection members being perpendicular, said first portion of said plurality of roof panel connection members extending across said plurality of roof panel members intermediate said opposing lateral edges, said second portion of said plurality of roof connection members extending downward from said first portion of said plurality of roof panel connection members adjacent said vertical support members, wherein said second portion of said plurality of said roof panel connection members includes an end configured to be operably coupled with said opening at said second end of said upper connection members;

wherein in said first mode, said platform member being open along said perimeter edge thereof.

16. The universal trailer configurable to operate in a plurality of modes as recited in claim 15, and further including a hoist-winch member, said hoist winch member being installed on a tongue section of the universal trailer, said hoist-winch member having arm members wherein the arm members are manipulated to assist in loading an object operably coupled thereto onto said platform member.

17. The universal trailer configurable to operate in a plurality of modes as recited in claim 16, and further including a first fastener and a second fastener, said first fastener and said second fastener being secured to said first side of said plurality of side panel members, said first fastener being operably couplable to said second fastener, said first fastener and said second fastener being located on opposing sides of a seam present between adjoining side panel members.

18. The universal trailer configurable to operate in a plurality of modes as recited in claim 17, wherein the seams present between the adjoining side panel members are weatherproof.

19. The universal trailer configurable to operate in a plurality of modes as recited in claim 18, wherein a front of the universal trailer formed by said first row of said side panel members further includes a hinged door over an opening, said opening configured to have a cable journaled therethrough when said hinged door is in an open position.

20. The universal trailer configurable to operate in a plurality of modes as recited in claim 19, that further includes a pair of roller members, said roller members being installed adjacent said hinged door, said roller members having a void therebetween to accommodate said cable therethrough.

\* \* \* \* \*